United States Patent [19]
Bayliss et al.

[11] Patent Number: 5,440,876
[45] Date of Patent: Aug. 15, 1995

[54] EXHAUST GAS PURIFICATION

[75] Inventors: Keith H. Bayliss, Bridgnorth; Stephen I. Hall, Oxford; David Raybone, Gloucester, all of United Kingdom

[73] Assignee: United Kingdom Atomic Energy Authority, Didcot, England

[21] Appl. No.: 166,937

[22] Filed: Dec. 15, 1993

[30] Foreign Application Priority Data

Jan. 20, 1993 [GB] United Kingdom ............ 9301433

[51] Int. Cl.⁶ .................................... F01N 3/20
[52] U.S. Cl. ............................ 60/274; 60/275; 60/295; 204/188; 423/252
[58] Field of Search ............... 60/274, 275, 295; 204/188; 423/252

[56] References Cited

U.S. PATENT DOCUMENTS

| | | | |
|---|---|---|---|
| 2,534,907 | 12/1950 | Ham | 204/188 |
| 2,998,308 | 8/1961 | Ruth | 60/275 |
| 3,180,083 | 4/1965 | Heller | 60/275 |
| 3,394,067 | 7/1968 | Shirley | 204/180 |
| 3,567,619 | 3/1971 | Brown | 204/302 |
| 3,928,158 | 12/1975 | Fritsche | 204/188 |
| 3,988,113 | 10/1976 | Roberts | 60/295 |
| 4,065,544 | 12/1977 | Hamling | 423/252 |
| 4,871,515 | 10/1989 | Reichle | 60/275 |
| 5,041,145 | 8/1991 | Kakinuma | 60/275 |

FOREIGN PATENT DOCUMENTS

| | | |
|---|---|---|
| 0366876 | 5/1990 | European Pat. Off. . |
| 0443625 | 8/1991 | European Pat. Off. . |
| 3708508 | 9/1988 | Germany . |
| 4028720 | 4/1991 | Germany . |
| 885582 | 12/1961 | United Kingdom . |
| WO91/00315 | 3/1991 | WIPO . |

*Primary Examiner*—Ira S. Lazarus
*Assistant Examiner*—Daniel J. O'Connor
*Attorney, Agent, or Firm*—William R. Hinds

[57] ABSTRACT

A method of removing particulate and other materials from the exhaust gases from an internal combustion engine in which the exhaust gas is passed through a bed of charged ferro-electric materials. Three forms of apparatus for carrying out the method are described.

16 Claims, 3 Drawing Sheets

GAS FLOW 100 sccm

DISCHARGE ON

5 MINS

NO DISCHARGE

BLOCKED
AFTER 7 MINS

10 MINS

12 MINS

EXHAUST GAS PURIFICATION

The present invention relates to the purification of gases and in particular to the reduction of the emission of particulate and other materials from the exhausts of internal combustion engines.

One of the major problems associated with the development and use of internal combustion engines is the noxious exhaust emissions from such engines. Two of the most deleterious materials, particularly in the case of diesel engines, are particulate carbon and oxides of nitrogen ($NO_x$). Increasingly severe emission control regulations are forcing internal combustion engine and vehicle manufacturers to find more efficient ways of removing these materials in particular from internal combustion engine exhaust emissions. Unfortunately, in practice, it is found that techniques which improve the situation in relation to one of the above components of internal combustion engine exhaust emissions tend to worsen the situation in relation to the other. Even so, a variety of systems for trapping particulate emissions from internal combustion engine exhausts have been investigated, particularly in relation to making such particulate emission traps capable of being regenerated when they have become saturated with particulate material.

Examples of such diesel exhaust particulate filters are to be found in European Patent Application EP 0 010 384; U.S. Pat. Nos. 4,505,107; 4,485,622; 4,427,418; and 4,276,066; EP 0 244 061; EP 0 112 634 and EP 0 132 166.

In all the above cases, the particulate matter is removed from diesel exhaust gases by a simple, physical trapping of particulate matter in the interstices of a porous, usually ceramic, filter body, which is then regenerated by heating the filter body to a temperature at which the trapped diesel exhaust particulates are burnt off. In most cases the filter body is monolithic, although EP 0 010 384 does mention the use of ceramic beads, wire meshes or metal screens as well. U.S. Pat. No. 4,427,418 discloses the use of ceramic coated wire or ceramic fibres.

In a broader context, the precipitation of charged particulate matter by electrostatic forces also is known. However, in this case, precipitation usually takes place upon large planar electrodes or metal screens.

According to the present invention there is provided a gas purification device, comprising a reactor chamber adapted to form part of a gas flow system, wherein the reactor chamber includes an active element through which in use gases to be purified are constrained to pass, consisting of a gas permeable body of pellets of a material having a high dielectric constant and at least one pair of electrodes by means of which the pellets within the active element can be charged electrically.

According to the invention in one aspect there is provided a reactor for reducing exhaust emissions from internal combustion engines, comprising a reactor chamber adapted to form part of an internal combustion engine exhaust system, the reactor chamber including an active element through which, in use, exhaust gases are constrained to pass consisting of a gas permeable body of pellets of a heat resistant material having a high dielectric constant and at least one pair of electrodes by means of which the pellets within the active element can be charged electrically.

According to the invention in a second aspect there is provided an exhaust system for an internal combustion engine, including a reactor chamber including an active element through which in use exhaust gases are constrained to pass consisting of a gas permeable body of pellets of a heat resistant material having a high dielectric constant and at least one pair of electrodes by means of which the pellets within the active element can be charged electrically.

Preferably there is included more than one reactor chamber and there is provided means whereby exhaust gases can be diverted from one reactor chamber to another.

Preferably the electrodes are in the form of metal grids which serve also to retain the pellets in position within the active element.

The pellets can be regular or irregular in shape and, preferably, in addition to having a high dielectric constant, the material out of which they are made has ferroelectric properties. Suitable materials are lead magnesium niobate, lead titanate, lead zirconate or barium titanate.

Preferably there may be provided also a second set of electrodes so positioned that in use exhaust gases pass the additional electrodes prior to entering a reactor chamber thereby enabling an electric charge to be created on particulate matter contained in the exhaust gas prior to its passage through the active element in the reactor chamber.

According to the invention in another aspect there is provided a method of reducing exhaust emissions from internal combustion engines, comprising the operations of passing exhaust gases from an internal combustion engine through a reactor chamber including an active element consisting of a gas permeable body of pellets of a heat resistant material having a high dielectric constant and applying an electric potential to the pellets in the active element.

Preferably the pellets are heated to a temperature sufficient to burn off carbonaceous deposits upon them; a suitable way of doing this continuously is to apply an AC potential of the order of tens of kilovolts to the pellets; the resulting microplasmas generated in the spaces between the pellets makes them self-cleaning.

The invention will now be described, by way of example, with reference to the accompanying drawings, in which FIG. 1 is a longitudinal section of a portion of an experimental reactor or reducing exhaust emissions from an internal combustion engine.

Figure 1:
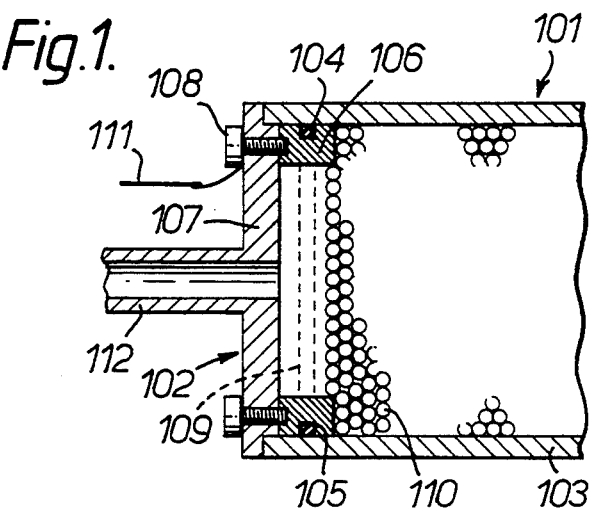
Figure 4:
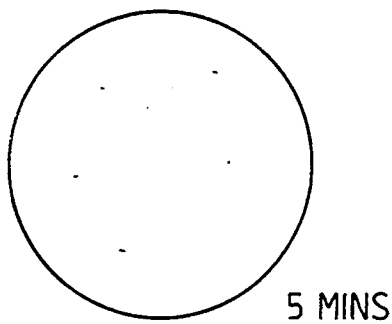
Figure 4:
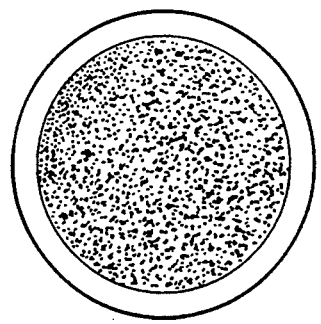
Figure 4:
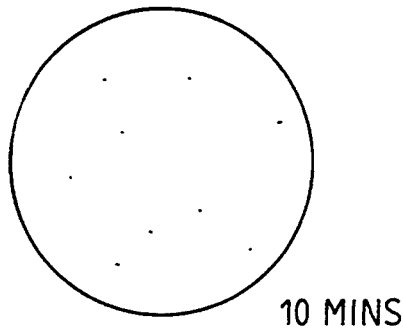
Figure 4:
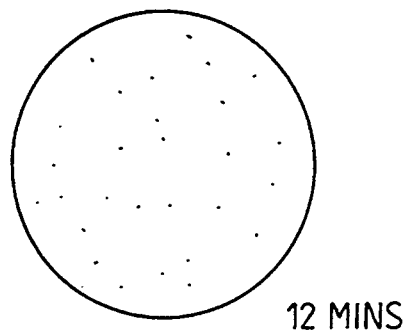
Figure 5:
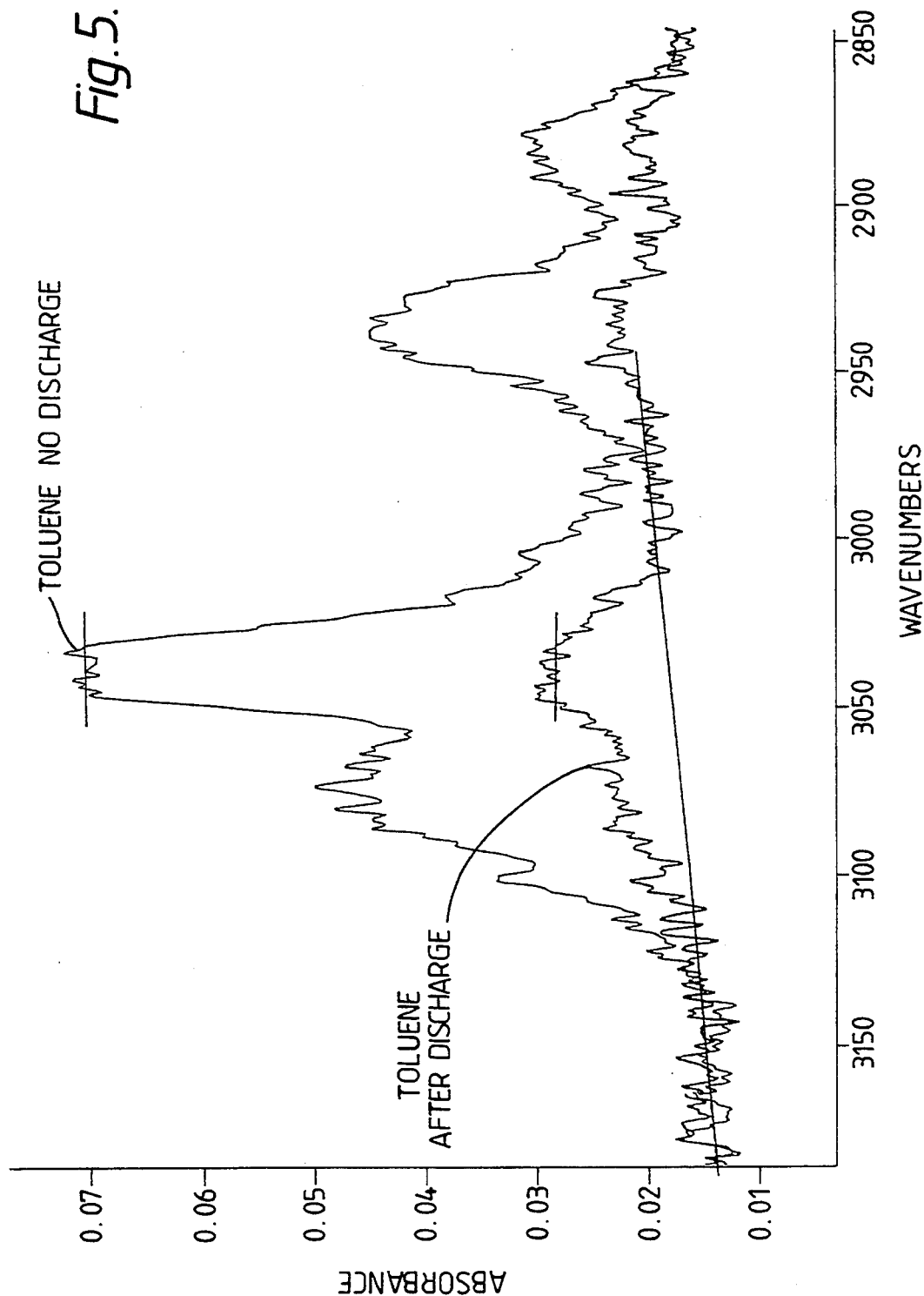

FIG. 4 shows particulate deposits on a filter paper included in a test system downstream of an experimental exhaust gas purification device according to FIG. 1 of the drawings at various intervals from the start of an experimental run both with the invention in operation and with the invention inoperative, and FIG. 5 shows part of two infra red absorption spectra of a test gas passed through the exhaust gas purification device of FIG. 1, both with it operative and inoperative.

Referring to FIG. 1 of the drawings, an experimental internal combustion engine exhaust purification apparatus consists of a reactor chamber 101, only one end of which is shown and described as the other end is identical. Each end of the reactor chamber 101 consists of a metal end-piece 102 which is adapted to fit inside a cylindrical envelope 103 which is made of an insulating ceramic material. A gas-tight seal between the end-piece 102 and the envelope 103 is made by an O-ring seal 104 which seats in a groove 105 formed in the end-piece 102. The end-piece 102 consists of an inner section 106 and an outer section 107 which are held together by a ring of set screws 108. A double mesh 109 made of stainless steel is held between the inner and outer sections 106 and 107 of the end-piece 102. The mesh 109 holds in place a body of ferro-electric pellets 110 and also acts as an electrode by means of which a voltage of the order of 20 kilovolts can be applied to the pellets 110 via a connection 111 to one of the set screws 108. The outer section 105 of the end-piece 102 has a hollow axial stub 112 by means of which exhaust gas from an internal combustion engine, not shown, can be admitted to the reactor chamber 101. A similar stub on the corresponding end-piece (not shown) at the other end of the reactor chamber 101 enables the purified exhaust gas to leave the reactor chamber 101. The reactor chamber 101 needs to be isolated electrically from the remainder of the exhaust system of which it forms a part. This can be done in any convenient way. For example, insulating coupling sleeves can be used which fit over the stub 112 and its counterpart at the other end of the reactor chamber 101. Alternatively the stubs can be isolated electrically from the remainder of their respective end pieces.

Figure 2:
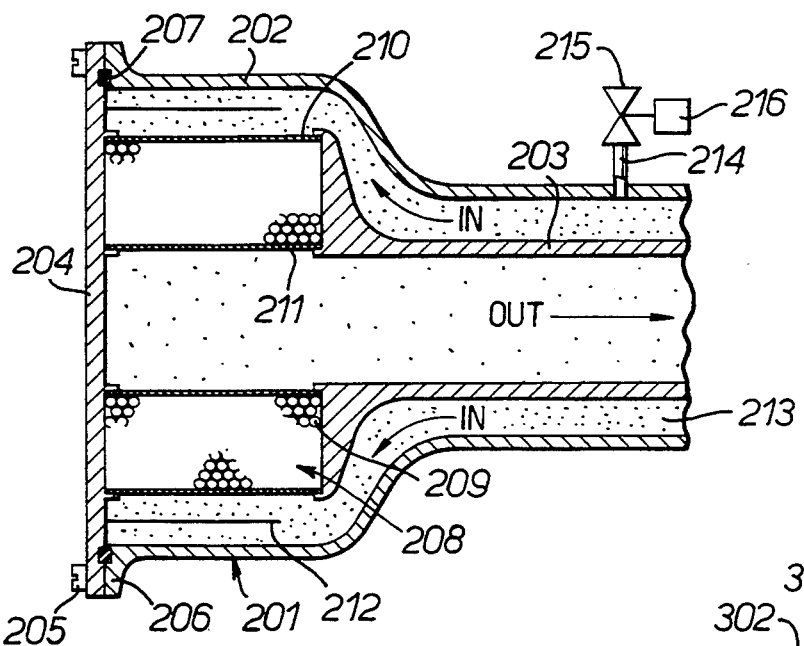
FIG. 2 is a longitudinal section of a rapid flow reactor chamber embodying the invention for use in removing particulate and other emissions from the exhaust gases emitted by a diesel engine.

Referring to FIG. 2 of the drawings, a reactor chamber 201 for use with a diesel engine exhaust system to reduce the emission of particulate carbonaceous material therefrom consists of a generally cylindrical outer portion 202, an inner portion 203 and an end plate 204 which is attached by means of a ring of bolts 205 to a flange 206 which forms part of the outer portion 202. A gas-tight seal between the outer portion 202 of the reactor chamber 201 and the end plate 204 is made by means of a gasket 207. The inner portion 203 of the reactor chamber 201 and the end plate 204 are adapted to receive and hold a body 208 of ferro-electric pellets 209 which are packed between two metal mesh cylinders 210 and 211. The cylinders 210 and 211 act as electrodes by means of which the pellets 209 can be charged. Also included is a cylindrical electrode 212 which surrounds the body 208 of pellets 209. The electrode (optional) 212 enables particulate carbonaceous material (soot) in exhaust gases 213 from a diesel engine (not shown) to be charged prior to their passage into and through the body 208 of pellets 209. An inlet port 214 and bleed valve 215 enable an oxidising gas to be fed from a reservoir 216 into the reactor chamber 201, if desired, to assist in regenerating the body 208 of pellets 209 by burning off the soot deposited upon them. Alternatively, a reducing gas such as ammonia or urea can be admitted into the reactor chamber 201 to reduce $NO_x$ to $N_2$.

In use, a high DC voltage of some kilovolts is applied to the outer electrode 210, which causes the pellets 209 to become strongly polarised and act as an electrostatic filter. The action of the body 208 of pellets 209 is enhanced by applying a similar voltage to the electrode 212 so as to charge soot particles in the exhaust gases 213.

If the body 208 of pellets 209 have become saturated with soot particles, it Can be regenerated in situ by a number of techniques. For example, an AC or pulsed DC voltage can be applied to the body 208 of pellets 209 by means of the electrodes 210 and 211 so as to create microplasmas on the surfaces of the pellets 209 which oxidise the soot particles. Alternatively, resistive heating of the pellets 209 can be employed using internal heating elements. Another possibility is to use microwave or RF radiation to create the microplasmas. In all cases, the regeneration can be aided by bleeding oxygen into the reactor chamber 201 via the port 214 and bleed valve 215. Yet another possible way of regenerating the pellets is to increase the temperature of the exhaust gases by making the engine run hot for a short period.

Figure 3:
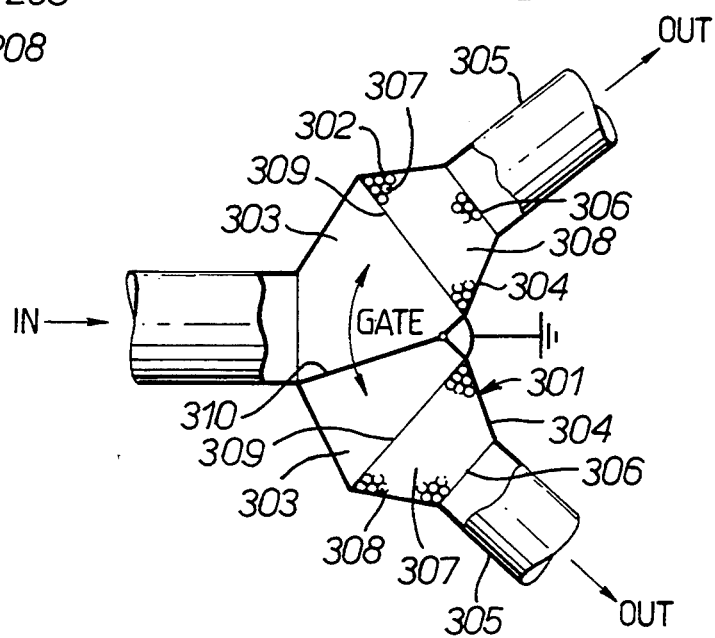
FIG. 3 is a representation of another embodiment of the invention.

FIG. 3 illustrates an arrangement which uses two reactor chambers 301 and 302, which are not illustrated in detail. Each of the reactor chambers 301 and 302 consists of a cylindrical inlet 303, a conical body portion 304 and an outlet 305. Also there are a perforated grid 306, a body 307 of ferro-electric pellets 308, a second perforated grid 309, which together with the grid 306 holds the pellets 308 in place, and an auxiliary charging electrode 309. The grid 304 is earthed and the grid 308 is insulated, so as to be capable of acting as a high voltage charging electrode.

The reactor chambers 301 and 302 are arranged in a Y-configuration and at their junction is placed a flap gate valve 310. In use, the flap valve 310 is arranged to close off one of the reactor chambers 301 and 302 so that it can be regenerated after use and then be ready for use while the other reactor chamber is in use, and vice versa. In order to assist starting of an engine in the exhaust system of which the reactor chambers 301, 302 are included, the flap valve 310 can be positioned so that both reactor chambers 301, 302 are in circuit together.

Referring to FIG. 4, there is shown two groups of filter papers which were installed in an experimental rig downstream of the exhaust gas purifier described with reference to FIG. 1, trough which smoke was passed. It can be seen that when a potential difference of about 20 kV was applied across the body of ferro-electric pellets 109 even after a period of twelve minutes, substantially all the particulate matter in the smoke was removed by the gas purifier, whereas when no potential difference existed across the body of ferro-electric pellets 109, the filter was totally blocked by particulate matter in the smoke.

FIG. 5 shows the results of a similar experiment in which toluene was present in a test gas passed through a purifier as described with reference to FIG. 1. As can be seen, the majority of the toluene was removed from the test gas.

It has been found in practice that if the applied potential is AC rather tan DC then the ferro-electric pellets show a degree or, self-cleaning ability and the lifetime before regeneration by heating is necessary is increased considerably. Under the normal range of diesel engine operating conditions the pellets are completely self cleaning when operated in the AC mode.

The self-cleaning effect is enhanced if the pellets are irregular in shape because the corners enhance the formation of microplasmas which assist the oxidation of carbonaceous deposits. Such microplasmas also assist the reduction of nitrous oxides when a reducing gas is added to the exhaust gases in the reactor chamber.

The dielectric constant of most ceramic/ferroelectric materials is a function of temperature with a well-defined maximum value. The material for the pellets 110, 209 therefore can be chosen in accordance with the position in the exhaust system at which the reactor is to be placed. For example, if it is to be placed at the exhaust manifold end of the exhaust system where the operating temperature is likely to be about 5°-600° C., then materials such as lead niobate, with or without magnesium as a constituent of the material, or lead titanate are suitable, whereas if the reactor is to be placed at the tail pipe end of the exhaust system where operating temperatures are about 300° C., then lead zirconate or related compounds are suitable. Other materials can be chosen for use in intermediate positions.

A particularly useful material is barium titanate because it appears to have catalytic properties which promote the reduction of $NO_x$ to $N_2$ as well as the oxidation of carbonaceous particles (soot) to $CO/CO_2/H_2O$.

We claim:

1. A reactor for reducing exhaust emissions from internal combustion engines, comprising a reactor chamber adapted to form part of an internal combustion engine exhaust system, wherein the reactor chamber includes an active element through which in use exhaust gases are constrained to pass consisting of a body of pellets of a heat resistant material having a high dielectric constant and at least one pair of electrodes by means of which the pellets within the active element can be charged electrically.

2. A reactor according to claim 1 wherein the material out of which the pellets are made has ferro-electric properties.

3. A reactor according to claim 1 wherein the material out of which the pellets are made is adapted to catalyse the reduction of $NO_x$ to nitrogen and the conversion of carbonaceous material to a gaseous mixture of carbon monoxide, carbon dioxide and water.

4. A reactor according to claim 1 wherein the pellets are made from lead magnesium niobate, lead titanate, lead zirconate or barium titanate.

5. A reactor according to claim 4 wherein the pellets are made of barium titanate.

6. A reactor according to claim 1 wherein there is included an additional set of electrodes so positioned that, in use, gases pass the additional electrodes prior to entering the active element within the reactor chamber.

7. A reactor according to claim 1 wherein there is provided means for admitting a reactive gas to the reactor chamber.

8. A reactor according to claim 1 wherein there is included means for heating the body of pellets to a temperature sufficient to cause the oxidation of carbonaceous deposits which may form on the pellets.

9. A reactor according to claim 1 incorporated into an exhaust system for an internal combustion engine.

10. A method of reducing exhaust gas emissions from an internal combustion engine, wherein there is included the operations of passing exhaust gases from an internal combustion engine through a reactor chamber including an active element consisting of a gas permeable body of pellets of a heat-resistant material having a high dielectric constant and applying an electric potential of the order of tens of kilovolts to the pellets in the active element so as to cause the removal from the exhaust gases of carbonaceous components of the exhaust gases.

11. A method according to claim 10 wherein the electric potential applied to the pellets is a pulsed d.c. or a.c. potential.

12. A method according to claim 10 including the operation of periodically heating the pellets to a temperature sufficient to burn off carbonaceous deposits upon them.

13. A method according to claim 10 including the operation of admitting a reactive gas to the reactor chamber.

14. A method according to claim 13 wherein the reactive gas is adapted to reduce nitrogeneous oxides contained in the exhaust gases.

15. A method according to claim 10 including the operation of subjecting exhaust gas from an internal combustion engine to an electric field prior to the exhaust gas entering the active element in the reactor chamber thereby initially to charge particulate matter entrained in the exhaust gas.

16. A method as claimed in claim 10 wherein the pellets are made of a material which has ferro-electric properties.

* * * * *

UNITED STATES PATENT AND TRADEMARK OFFICE
CERTIFICATE OF CORRECTION

PATENT NO. : 5,440,876
DATED : August 15, 1995
INVENTOR(S) : Keith H. Bayliss; Stephen I. Hall; David Raybone It is certified that error appears in the above—identified patent and that said Letters Patent is hereby corrected as shown below:

In column 1, lines 47-55 are deleted.

In column 4, line 20, "309" is deleted, "304" is changed to --309--, and "308" is changed to --306--.

Signed and Sealed this

Eighth Day of October, 1996

Attest:

BRUCE LEHMAN

Attesting Officer     Commissioner of Patents and Trademarks